US006867959B2

(12) United States Patent
Haugaard et al.

(10) Patent No.: US 6,867,959 B2
(45) Date of Patent: Mar. 15, 2005

(54) DOUBLE-WALL BALLAST ENGAGEMENT AND BALLAST MOUNTING METHOD

(75) Inventors: Eric Haugaard, Kenosha, WI (US); Kurt Wilcox, Libertyville, IL (US)

(73) Assignee: Ruud Lighting, Inc., Racine, WI (US)

( * ) Notice: Subject to any disclaimer, the term of this patent is extended or adjusted under 35 U.S.C. 154(b) by 0 days.

(21) Appl. No.: 10/280,946

(22) Filed: Oct. 25, 2002

(65) Prior Publication Data

US 2004/0080951 A1 Apr. 29, 2004

(51) Int. Cl.[7] .................................................. H02B 1/18

(52) U.S. Cl. ........................ 361/674; 361/600; 361/704; 361/810; 174/DIG. 2; 362/264

(58) Field of Search ................................ 361/600, 674, 361/704; 174/52.1; 362/367, 373–375

(56) References Cited

U.S. PATENT DOCUMENTS

| | | | | | |
|---|---|---|---|---|---|
| 3,025,337 | A | * | 3/1962 | Leoni | 174/52.1 |
| 3,428,737 | A | * | 2/1969 | Pou | 174/52.1 |
| 4,082,141 | A | | 4/1978 | Perretta | |
| 4,472,768 | A | * | 9/1984 | Quiogue | 362/370 |
| 5,030,889 | A | | 7/1991 | El-Hamamsy et al. | |
| 5,508,882 | A | | 4/1996 | Lee | |
| 5,566,047 | A | * | 10/1996 | Kahn et al. | 361/674 |
| 6,031,338 | A | | 2/2000 | Yoon et al. | |
| 6,174,074 | B1 | * | 1/2001 | Lahijani | 362/264 |
| 6,497,499 | B1 | * | 12/2002 | Fischer et al. | 362/265 |

* cited by examiner

*Primary Examiner*—Boris Chérvinsky
(74) *Attorney, Agent, or Firm*—Jansson, Shupe & Munger, Ltd.

(57) ABSTRACT

A housing 20 for electrical lighting fixtures with improved ballast mounting is disclosed. The ballast 10 is mounted such that it tightly engages two walls 30,40 of the housing. The housing is a heat sink and heat from the ballast is efficiently transferred to the two walls. The ballast is preferably mounted to one of the two walls. The wall to which the ballast is mounted preferably includes a channel 33 and the ballast preferably includes a bore 12, such that a rod 50 passing through the bore and positioned in the channel mounts the ballast to the wall. A method of mounting a ballast to a housing for electrical lighting fixtures such that the ballast tightly engages two walls of the housing is also disclosed. Such mounting is preferably performed by a single mount.

22 Claims, 6 Drawing Sheets

DOUBLE-WALL BALLAST ENGAGEMENT AND BALLAST MOUNTING METHOD

FIELD OF THE INVENTION

This invention relates generally to housings for electrical lighting fixtures, and more specifically to housings which enclose ballasts.

BACKGROUND OF THE INVENTION

Many lighting systems use lamps which are powered by electronic or magnetic inductive devices, e.g., ballasts, that control the applied voltage and current. Conventional ballasts often use "open core and coil" construction, in which a core of laminated steel, iron, or similar material has windings of exposed coils of wire. Transformers can also be constructed in this open core and coil format.

It is well known that lighting systems consume energy which is converted into usable light and a typically undesirable amount of heat. Heat can be very damaging to lighting components, causing compromised performance or failure. Leaving burned-out lamps in the fixture, using the wrong size lamps, incorrect wiring, incorrect line voltage, component failure, operation at temperatures below or above the rated limits or power surges can all cause a ballast to overheat and fail. A failing ballast can get extremely hot and become a fire hazard. While some ballasts include a safety device which shuts the ballast off in case of extreme thermal conditions, certain types of failure may prevent that shutdown. Therefore, a medium for dissipating heat is critical to the performance of ballasts.

The mounting of core and coil ballasts within the enclosure of a lighting fixture housing is critical to its operation. While heat dissipation leading to premature ballast failure can be prevented by using an open core and coil ballast (rather than an encapsulated ballast), it is typically necessary to install the open core and coil ballast in a way that conduction and radiation take place to dissipate the heat generated.

Typically, heat is transferred from the ballast to the fixture housing which encloses the ballast, lamp and other electrical lighting fixtures. This heat transfer may be facilitated by the application of grease, gel, resin and the like to the single surface of the ballast case which is connected with respect to the housing. Mounting plates have also been used to provide a medium for heat transfer from one surface of the ballast to one surface of the housing. While heat transfer is a major concern in housing design, the housing must also provide free access to ballast components and wiring so that maintenance can be performed.

In addition, many users of lighting fixtures require that the dimensions of the fixtures be made as small as possible so that the fixtures utilize as little of the space of an installation site as possible. For outdoor floodlighting, it is important that the fixtures be as unobtrusive as possible and capable of blending in with the surrounding architecture or of being hidden. For industrial-type lighting fixtures for low and medium height mounting installations, it is important that the fixtures interfere as little as possible with existing equipment such as air-conditioning and heating equipment, fire sprinkler systems and plumbing and electrical equipment. Whatever their use, it is desirable that the fixtures minimize material costs, comprise as few parts as possible and be easily and quickly assembled to minimize manufacturing costs.

Typical housings for electrical lighting fixtures are constructed from aluminum, steel, composites or other metals and must be designed in view of these size concerns as well as a variety of factors including separation of the ballast from other heat-sensitive components, aesthetic appeal, and the ability to transfer heat, among others. In the prior art, these concerns have resulted in housings which provide for heat transfer from the ballast to the housing only through brackets or mounting plates or from one surface of the ballast to only one surface of the housing. Such prior art housings and ballasts do not provide sufficient heat transfer for certain applications.

Therefore, there is a need for an improved housing for electrical lighting fixtures which provides for increased heat transfer from ballasts. There is also a need for a compact, low-cost, reliably assembled, and easily usable housing for electrical lighting fixtures which ensures good thermal transfer from a ballast enclosed therein.

OBJECTS OF THE INVENTION

Accordingly, a principal object of this invention is to provide an improved housing for electrical lighting fixtures overcoming the problems and shortcomings described above.

Another object of this invention is to provide a housing for electrical lighting fixtures that is particularly suitable to the needs of lighting manufacturers in connection with requirements for heat transfer from an enclosed ballast.

Another object of this invention is to provide a housing for electrical lighting fixtures that provides for heat transfer between at least two sides or panels of the ballast and at least two walls of the housing.

Another object of this invention is to provide a housing for electrical lighting fixtures that provides for tight engagement between the ballast and two walls of the housing.

Another object of this invention is to provide a housing for electrical lighting fixtures that provides for tight engagement between the ballast and two walls of the housing through use of a single mount.

Another object of this invention is to provide a housing for electrical lighting fixtures that includes at least one channel for receiving a rod passing through a ballast to enable tight engagement between the housing and ballasts having a variety of different sizes.

Another object of this invention is to provide a housing for electrical lighting fixtures that utilizes a flexible rod to provide tight engagement between two walls of the housing and ballasts having a variety of sizes.

Another object of this invention is to provide a housing for electrical lighting fixtures that provides for easy installation of ballasts having a variety of sizes such that any ballast tightly engages two walls of the housing.

Still another object of this invention is to provide a method of mounting a ballast to a housing for electrical lighting fixtures such that the ballast tightly engages two walls of the housing.

Yet another object of this invention is to minimize the cost of assembly and installation of ballasts into housings.

These and other objects of the invention will be apparent from the following descriptions and from the drawings.

SUMMARY OF THE INVENTION

The present invention is an improved housing for electrical lighting fixtures of the type enclosing ballasts and lamps. The improved housing overcomes the above-noted problems and shortcomings and satisfies the objects of the invention. The housing of this invention includes a first wall (depicted in the drawings as a bottom wall) and side walls. In the improved housing for electrical lighting fixtures, the ballast is tightly engaged with at least two walls. The housing is a heat sink and heat from the ballast is transferred to the two engaged walls. In preferred embodiments, a single mount urges the ballast into tight engagement with at least two walls. In a highly preferred embodiment, the ballast is mounted to one of the at least two walls.

In a preferred embodiment, the wall which the ballast is mounted to includes at least one channel and the ballast includes at least one bore. In this preferred embodiment, the housing further includes a first rod which passes through a first bore and is positioned in a first channel to mount the ballast to the first wall. The first rod preferably acts as the single mount which urges the ballast into tight engagement with at least two walls.

It is preferable that the first rod be able to flex to accommodate ballasts having bores at varying positions. For instance, the housing can accommodate both a ballast having a bore at a position 0.15 cm from its external wall or a ballast having a bore at a position 0.30 cm from its external wall since the rod can pass through the bore and bend to be positioned in the standard-positioned channel. In preferred embodiments, the ballast has a width in a first direction and the bore extends through the ballast in the same direction. The channel is preferably bounded only at positions on opposite sides of the ballast such that the rod is not impeded by the channel between the opposite bounded positions. The first rod is preferably longer than the width of the ballast such that the rod passes through the bore and is positioned in the bounded portions of the channel, i.e., the rod cradles, on opposite sides of the ballast. In this preferred embodiment, the channel and the bore need not be aligned to permit the rod to pass through the bore and be positioned in the cradles.

In certain preferred embodiments, the ballast includes a second bore extending through the width and located near the side opposite the first bore, the housing includes a second channel on the first wall and a second rod passes through the second bore and is positioned in the second channel to permit mounting the ballast to the first wall of the housing.

In other certain preferred embodiments, the housing includes a primary pair of holes for receiving a pair of screws. The primary pair of holes are preferably positioned adjacent the first channel on opposite sides of the ballast such that the screws are able to hold the first rod in the first channel when the screws are positioned in the primary pair of holes. In such an embodiment, the housing may further include a secondary pair of holes for receiving a pair of screws. The secondary pair of holes are preferably positioned adjacent the first channel on opposite sides of the ballast such that the screws hold the first rod in the first channel when the screws are positioned in the secondary pair of holes. The secondary holes may be used in conjunction with the primary pair of holes, or they may be used if the primary holes are worn out or otherwise damaged. In highly preferred embodiments, a primary and secondary pair of holes are likewise positioned adjacent the second channel.

In the preferred housing, a platform is integrally formed with the first wall. The platform preferably includes slots which may includes apertures for receiving fasteners which can stabilize the position of the ballast when the ballast is positioned on the platform. The platform and the first channel are preferably relatively positioned such that the ballast tightly engages the platform when a bolt passing through the first bore is positioned in the first channel. This distance between the platform and the channel is preferably less than or equal to the distance between the bore and the bottom panel of the ballast such that the rod may flex when positioned in the bore and cradles and urge the ballast into tight engagement with the platform.

The present invention also includes a novel method of mounting ballasts to housings for electrical lighting fixtures which include first and side walls. The method comprises mounting the ballast to one of the first or side walls such that the ballast tightly engages the one and another of the first and side walls.

In a preferred embodiment, the mounting of the ballast to the housing is performed by passing a rod through the bore; positioning the ballast in the housing such that the ballast tightly engages the one and the another of the first and side walls; positioning the rod in the cradle; and securing the rod in the cradle. In certain preferred embodiments, the passing step is performed before the positioning steps.

In another preferred embodiment, the wall to which the ballast is mounted includes at least one slot, and the method further comprises inserting a fastener into the slot, preferably into an aperture formed by the slot, such that the fastener contacts the ballast to stabilize the position of the ballast.

In yet another preferred embodiment, the ballast includes a second bore, the wall to which the ballast is mounted includes a second cradle, and the mounting step further includes passing a second rod through the second bore; positioning-the second rod in the second cradle; and securing the second rod in the second cradle. In certain preferred embodiments, the passing step is performed before the positioning steps.

DETAILED DESCRIPTION OF PREFERRED EMBODIMENTS

Figure 1:
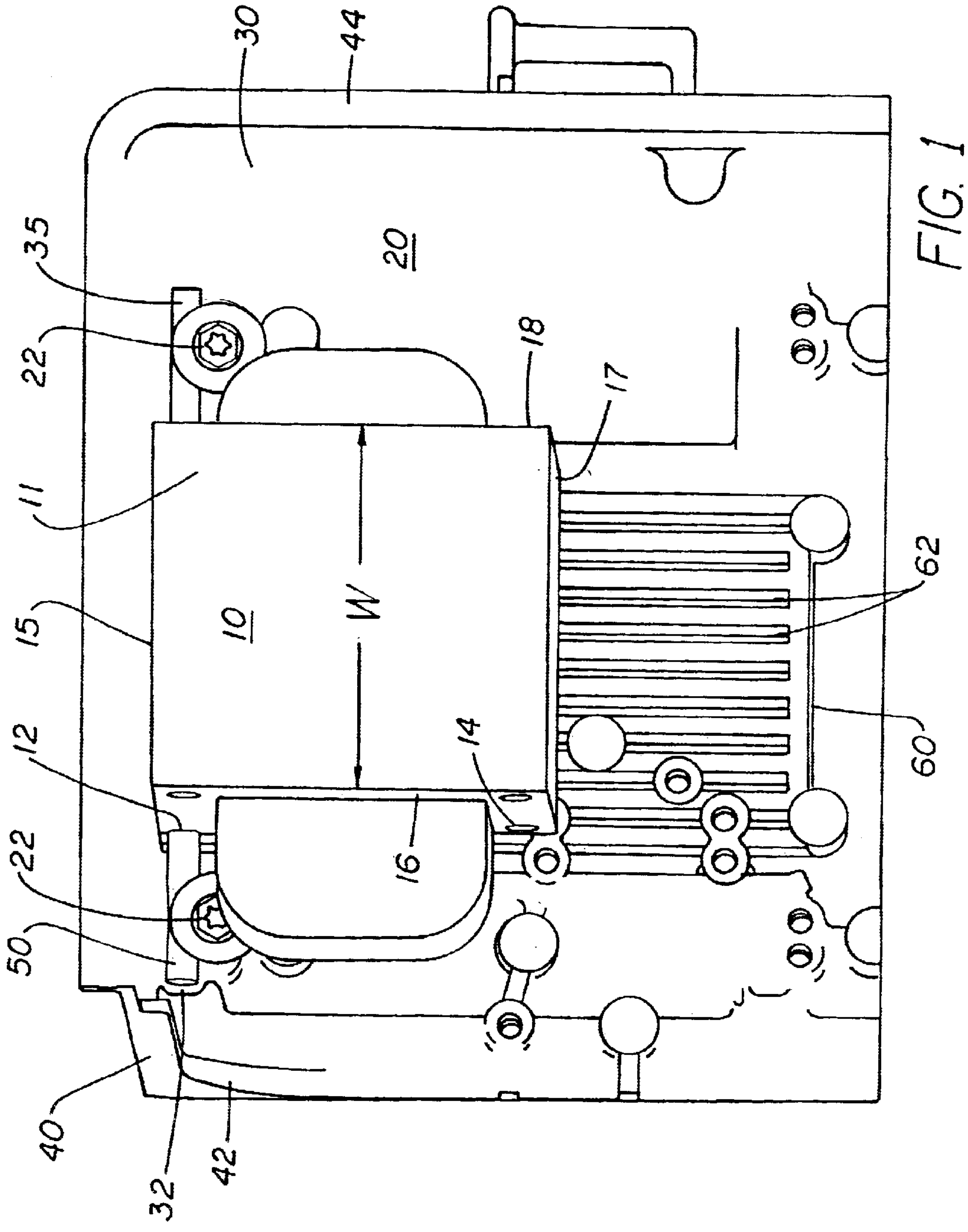
FIG. 1 is an overhead perspective view of the ballast mounted to the housing with parts broken away in accordance with this invention.

The figures illustrate preferred embodiments of this invention. FIG. 1 is an overhead perspective view of a ballast 10 mounted to a housing 20. As depicted, ballast 10 has a top panel 11, bottom panel 13 (indicated in FIG. 2), first and second end panels 15,17 and first and second side panels 16,18. Ballast 10 has a width W between first and second side panels 16,18 in a first direction designated by the arrows. First and second bores 12,14 extend through ballast 10 from first side panel 16 to second side panel 18. The distance between first bore 12 and first end panel 15 and the distance between second bore 14 and second end panel 17 may vary depending on the size or type of ballast 10. Likewise, the distance between first bore 12 and bottom panel 13 and the distance between second bore 14 and bottom panel 13 may vary. Ballast 10 may be of the high-reactance, constant wattage auto transformer (CWA), reactor or other type.

Figure 2:
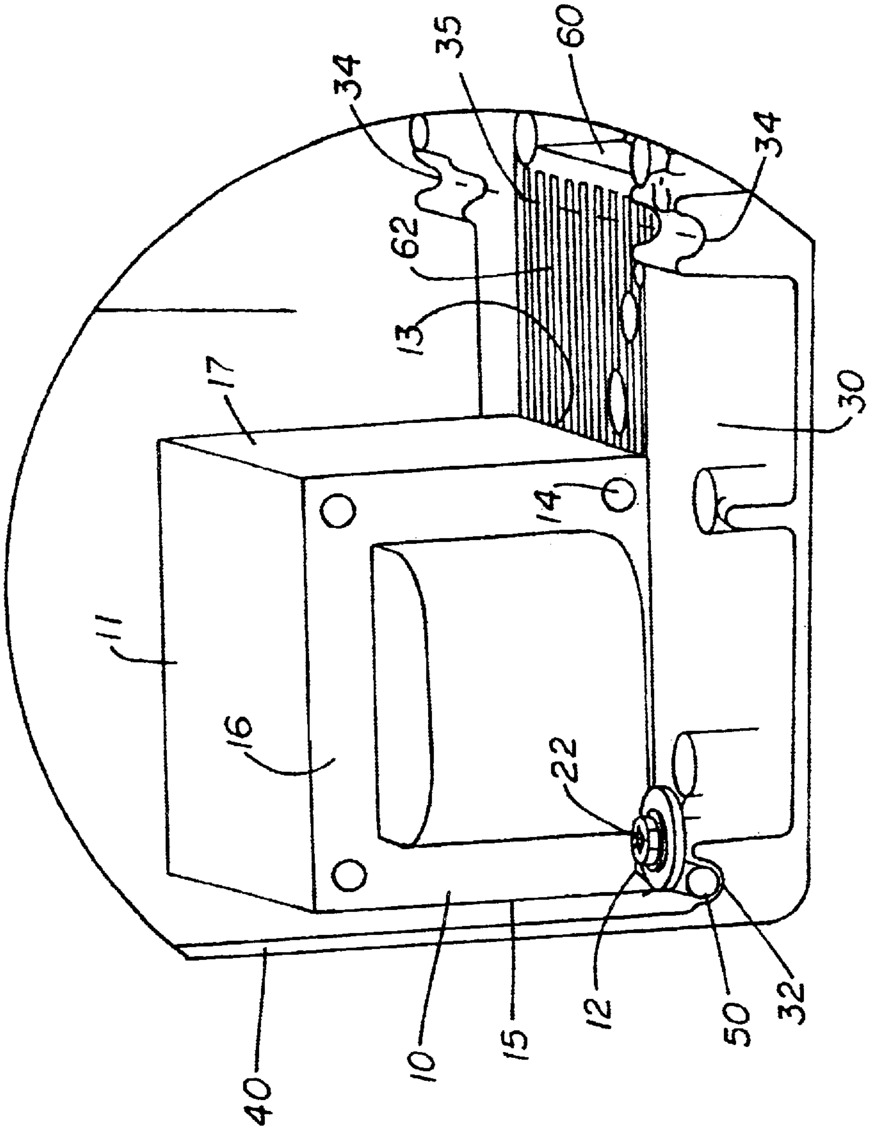
FIG. 2 is a side perspective view of the ballast mounted to the housing in accordance with this invention.

Housing 20 includes a first wall 30 and a first side wall 40, second side wall 42, third side wall 44 and fourth side wall (not shown) with first side wall 40 rising substantially perpendicularly from first wall 30. First wall 30 includes platform 60 which forms a first pair of rod cradles 32 and a second pair of rod cradles 34. The first and second pair of rod cradles 32,34 each form a respective rod channel (generally designated by lines 33,35). In FIGS. 1 and 2, a first rod 50 passes through first bore 12 and is positioned in first cradles 32 and first channel 33. FIG. 1 shows a first pair of screws 22 positioned adjacent first channel 33 and screwed into first wall 30 so as to hold first rod 50 in position in first pair of rod cradles 32. When tightened, first screws 22 ensure that bottom panel 13 of ballast 10 remains tightly engaged with first wall 30 and first end panel 15 of ballast 10 remains tightly engaged with first side wall 40, that is, ballast 10 contacts first wall 30 and first side wall 40 such that heat can be transferred directly from ballast 10 to first wall 30 and first side wall 40.

Figure 3:
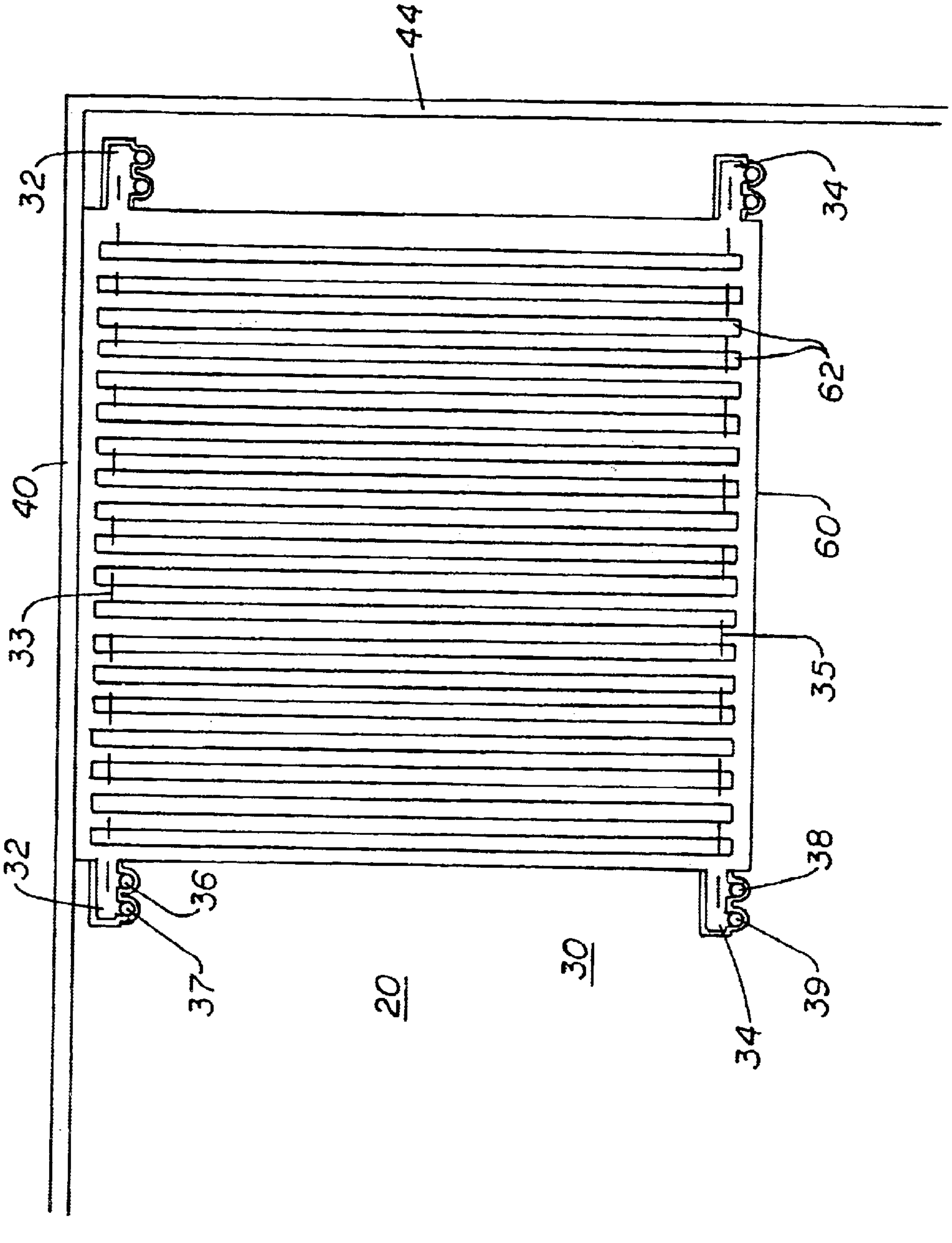
FIG. 3 is an overhead view of the housing in accordance with this invention.
Figure 4:
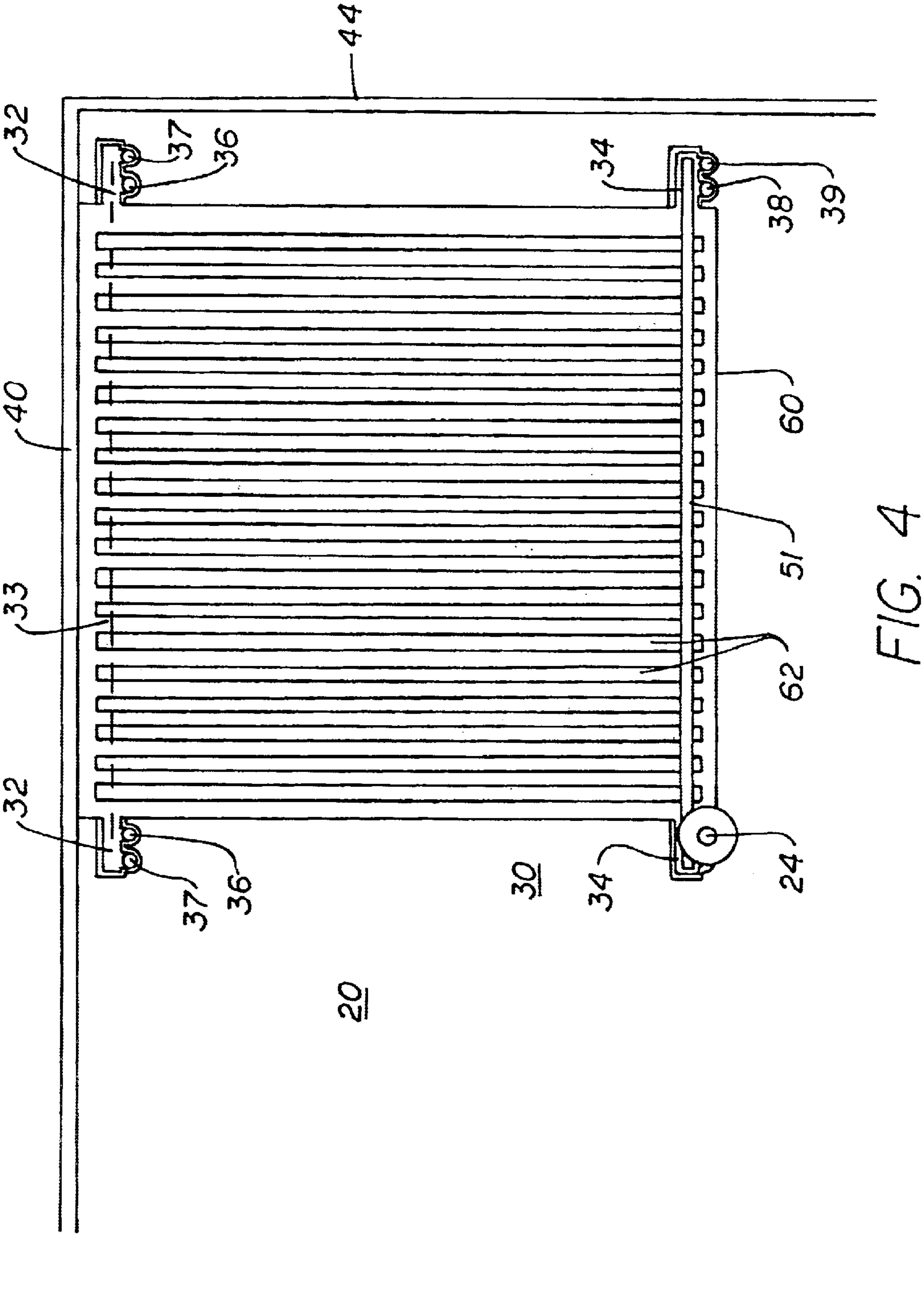
FIG. 4 is an overhead view of the housing and includes the second rod positioned in the second channel and secured by one screw.

FIGS. 3 and 4 are overhead views of housing 20 which more clearly illustrate the features of first wall 30. As shown, platform 60 includes a number of slots 62. Platform 60 also forms first primary and secondary holes 36,37 and second primary and secondary holes 38,39 adjacent to first channel 33 and second channel 35 respectively. In addition, platform 60 forms first and second rod cradles 32,34 which are dimensioned to allow adjustment of rods 50,51 when positioned in the cradles 32,34 and flexed by connection to ballast 10. FIG. 4 includes rod 51 positioned in channel 35 and secured to one of rod cradles 34 by screw 24. Screw 24 includes a washer which completely covers rod 51 and ensures secure positioning.

Figure 5:
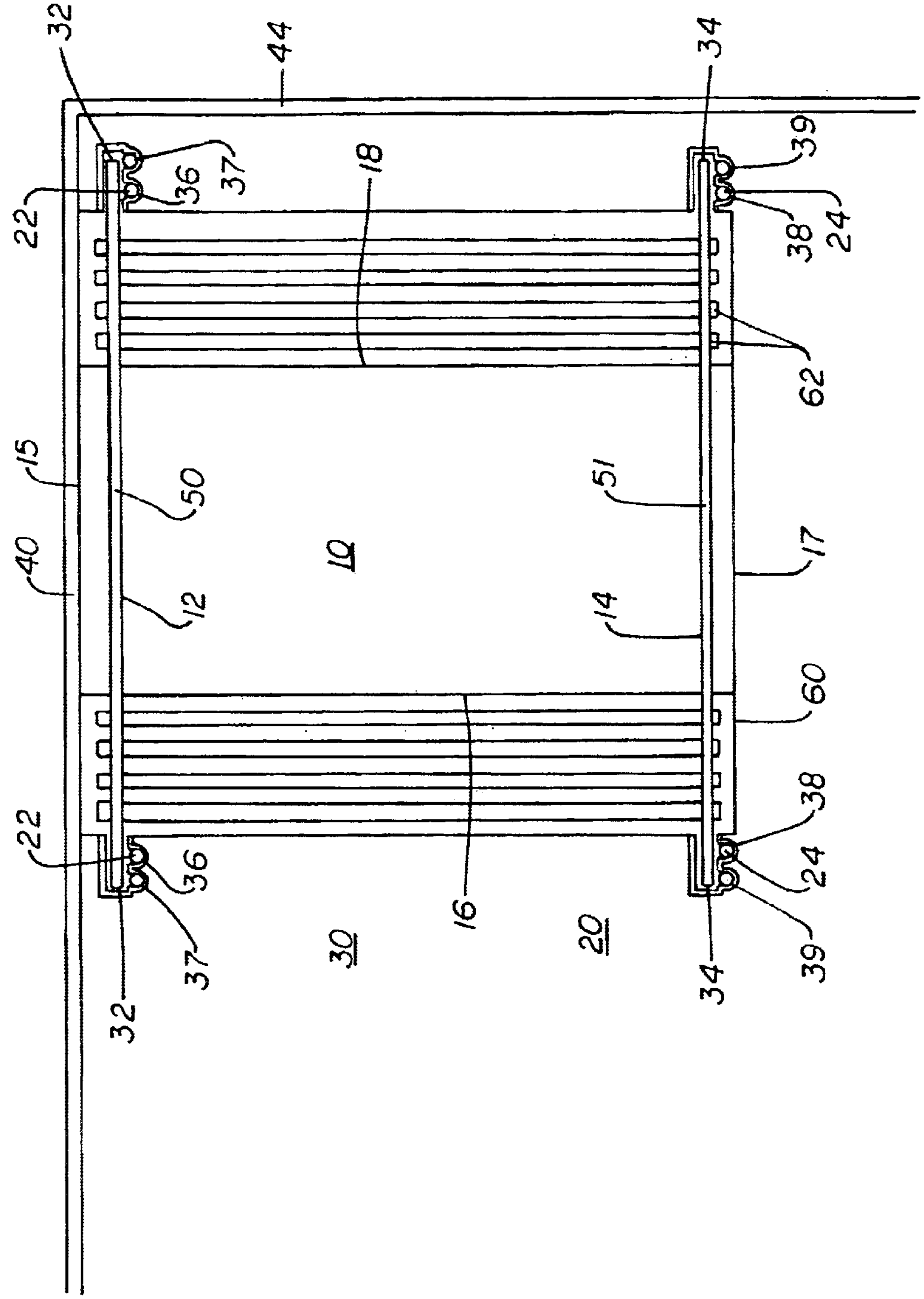
FIG. 5 is a downward cross-sectional view of the housing and ballast taken along the plane defined by the bores, the ballast being mounted to the housing with two rods.
Figure 6:
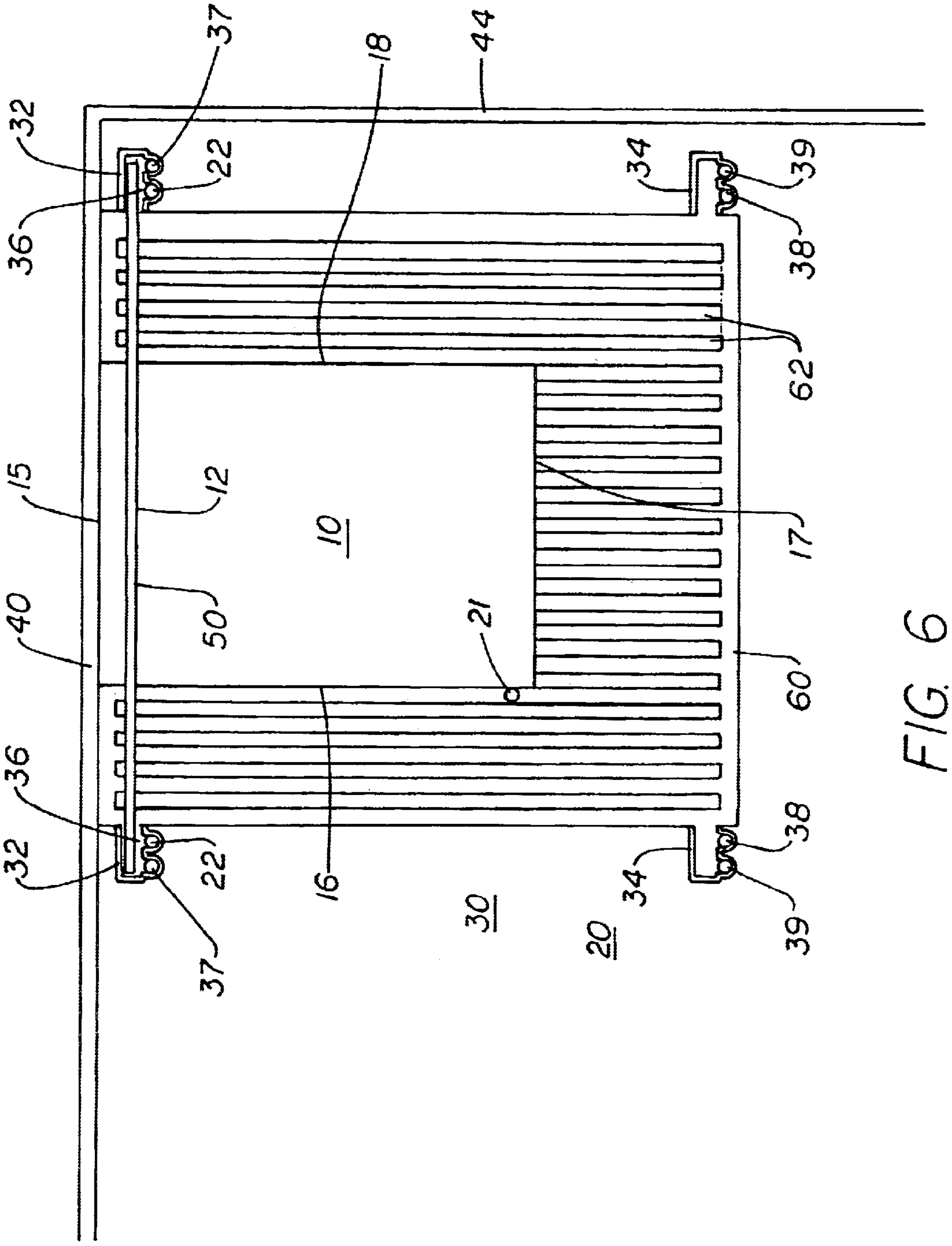
FIG. 6 is a downward cross-sectional view of the housing and ballast taken along the plane defined by the bores, the ballast being mounted to the housing with one rod.

FIGS. 5 and 6 are cross-sectional views taken along the plane of bores 12,14 and showing ballast 10 mounted to housing 20. In FIG. 5, ballast 10 is connected to housing 20 through first rod 50 and second rod 51. First rod 50 is positioned as discussed above. Second rod 51 extends through second bore 14 and is positioned in second rod cradles 34. FIG. 5 shows a second pair of screws 24 positioned adjacent second channel 35 and screwed into first wall 30 so as to hold second rod 51 in position in second cradles 34. When tightened, second screws 24 further ensure that bottom panel 13 of ballast 10 remains tightly engaged with first wall 30 and first end panel 15 of ballast 10 remains tightly engaged with first side wall 40, that is, ballast 10 contacts first wall 30 and first side wall 40 such that heat can be transferred directly from ballast 10 to first wall 30 and first side wall 40.

As shown in FIG. 5, first screws 22 are preferably screwed into a first primary set of holes 36 which are formed in first wall 30 adjacent first channel 33. A first secondary set of holes 37 may be formed in first wall 30 adjacent first channel 33 to provide alternate positions for first screws 22 in case the first primary holes 36 are stripped, damaged or not used for other reasons. Second screws 24 are preferably screwed into a second primary set of holes 38 which are formed in first wall 30 adjacent second channel 35. A second secondary set of holes 39 may be formed in first wall 30 adjacent second channel 35 to provide alternate positions for second screws 24 in case the second secondary holes 38 are stripped, damaged or not used for other reasons.

As stated above, platform 60 also includes slots 62 which preferably extend in a direction substantially perpendicular to the rod channels 33,35. One or more fasteners 21, such as screws, can be inserted into apertures defined by slots 62 adjacent first side panel 16, second side panel 18 and/or second end panel 17 to further brace ballast 10. Apertures formed by slots 62 allow for positioning of fasteners 21 in a variety of positions to allow for use of housing 20 with ballasts 10 of different sizes. FIG. 6 shows a ballast 10 which is mounted to housing 20 only by a single rod 50. In such a case, fastener 21 may be mounted to on of slots 62 to ensure ballast 10 is not moved during maintenance or during other handling.

The distance between first channel 33 and first side wall 40 is preferably less than or equal to the distance between first bore 12 and first end panel 15 of the ballast 10. The distance between first channel 33 and first wall 30 is preferably less than or equal to the distance between first bore 12 and bottom panel 13 of the ballast 10. First rod 50 is flexible so that it can pass through first bore 12 and be positioned in first cradles 33 despite cases where first bore 12 is a greater distance from first side wall 40 and/or first wall 30 than first channel 33. As first rod 50 attempts to straighten, first end panel 15 is forced tightly against first side wall 40 and first wall 30 such that heat is transferred directly from first end panel 15 to first side wall 40 and first wall 30.

Appropriate materials and parts for the devices of this invention will be apparent to those who are skilled in the art and are made aware of this invention. While the principles of the invention have been shown and described in connection with specific embodiments, it is to be understood that such embodiments are by way of example and are not limiting.

The claimed invention is:

1. In a housing for electrical lighting fixtures, the housing of the type enclosing ballasts and lamps, the housing including first and side walls, the improvement wherein a ballast is directly and tightly engaged with at least two walls.

2. The housing of claim 1 wherein the housing is a heat sink and heat from the ballast is transferred to the at least two walls.

3. The housing of claim 1 wherein a single rod mounts the ballast to the housing and urges the ballast into tight engagement with at least two walls.

4. The housing of claim 1 wherein the ballast is mounted to one of the at least two walls.

5. The housing of claim 1 wherein the ballast has a width and is directly and tightly engaged with at least two walls along substantially the entire width.

6. In a housing for electrical lighting fixtures, the housing of the type enclosing ballasts and lamps, the housing including first and side walls, the improvement wherein a ballast is tightly engaged with at least two walls, the ballast is mounted to one of the at least two walls, the first wall includes at least one channel, the ballast includes at least one bore, and a first rod passes through a first bore and is positioned in a first channel to mount the ballast to the first wall.

7. The housing of claim 6 wherein the first rod is able to flex to accommodate ballasts having bores at varying positions.

8. The housing of claim 7 wherein the ballast has a width in a first direction, the bore extends through the ballast in the first direction, the channel is bounded at positions on opposite sides of the ballast, and the first rod is longer than the width such that the rod passes through the bore and is positioned in the channel on opposite sides of the ballast.

9. The housing of claim 7 wherein the channel and the bore are not aligned.

10. The housing of claim 6 further including a second rod passing through a second bore and positioned in a second channel to mount the ballast to the first wall.

11. The housing of claim 6 further including a primary pair of holes for receiving a pair of screws, the primary pair of holes positioned adjacent the first channel on opposite sides of the ballast such that the screws hold the first rod in the first channel when the screws are positioned in the primary pair of holes.

12. The housing of claim 11 further including a secondary pair of holes for receiving a pair of screws, the secondary holes positioned adjacent the first channel on opposite sides of the ballast such that the screws hold the first rod in the first channel when the screws are positioned in the secondary pair of holes.

13. The housing of claim 6 further including a second rod passing through a second bore and positioned in a second channel to mount the ballast to the first wall.

14. The housing of claim 6 wherein the first wall includes a platform, the ballast being mounted to the platform, the platform including slots for receiving fasteners to stabilize the position of the ballast.

15. The housing of claim 14 wherein the platform and the first channel are relatively positioned such that the ballast tightly engages the platform when a first bolt passing through the first bore is positioned in the first channel.

16. A method of mounting a ballast to a housing for electrical lighting fixtures, the housing having a first wall and side walls, the method comprising mounting the ballast to one of the first or side walls such that the ballast directly and tightly engages the one and another of the first and side walls.

17. The method of claim 16 wherein the ballast includes a bore and the one of the first or side walls includes at least one cradle, the mounting step including:

passing a rod through the bore;

positioning the ballast in the housing such that the ballast tightly engages the one and the another of the first and side walls;

positioning the rod in the at least one cradle; and securing the rod in the at least one cradle.

18. The method of claim 17 wherein the passing step is performed before the positioning steps.

19. The method of claim 17 wherein the one of the first or side walls includes at least one slot, the method further comprising inserting a fastener into the slot such that the fastener contacts the ballast to stabilize the position of the ballast.

20. The method of claim 17 wherein the ballast includes a second bore and the one of the first or side walls includes a second cradle, the mounting step further including:

passing a second rod through the second bore;

positioning the second rod in the second cradle; and securing the second rod in the second cradle.

21. The method of claim 20 wherein the passing a second rod through the second bore step is performed before the positioning steps.

22. The method of claim 16 wherein the ballast has a width and is directly and tightly engaged with at least two walls along substantially the entire width.

* * * * *